(12) United States Patent
Yang

(10) Patent No.: US 7,207,086 B2
(45) Date of Patent: Apr. 24, 2007

(54) ROTATING STRUCTURE AND ELECTRONIC DEVICE UTILIZING SAME

(75) Inventor: Chun-Fei Yang, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 212 days.

(21) Appl. No.: 10/910,397

(22) Filed: Aug. 3, 2004

(65) Prior Publication Data
US 2005/0241108 A1    Nov. 3, 2005

(30) Foreign Application Priority Data
Apr. 6, 2004    (TW) .............................. 93109465 A

(51) Int. Cl.
*E05D 3/06*    (2006.01)
(52) U.S. Cl. .............................. 16/366; 16/368; 16/342
(58) Field of Classification Search .................. 16/366, 16/368, 371, 346, 347, 277, 295, 294, 298, 16/299, 342; 361/680–682
See application file for complete search history.

(56) References Cited

U.S. PATENT DOCUMENTS

| | | | |
|---|---|---|---|
| 1,601,112 A * | 9/1926 | Cummings | 108/38 |
| 4,684,017 A * | 8/1987 | Watanabe et al. | 206/235 |
| 4,825,395 A * | 4/1989 | Kinser et al. | 361/680 |
| 5,845,366 A | 12/1998 | Kuroda | 16/229 |
| 5,901,415 A * | 5/1999 | Morrison et al. | 16/371 |
| 5,915,441 A * | 6/1999 | Schlack | 16/371 |
| 6,230,365 B1 * | 5/2001 | Lu | 16/342 |
| 6,449,144 B1 * | 9/2002 | Yeh | 361/681 |

FOREIGN PATENT DOCUMENTS

| | | | |
|---|---|---|---|
| DE | 3602718 A1 * | 8/1987 | |
| JP | 02268311 A * | 11/1990 | |
| TW | 389338 | 5/2000 | |
| TW | 446135 | 7/2001 | |
| TW | 496538 | 7/2002 | |

* cited by examiner

*Primary Examiner*—Katherine Mitchell
*Assistant Examiner*—Michael J. Kyle
(74) *Attorney, Agent, or Firm*—Thomas, Kayden, Horstemeyer & Risley

(57) ABSTRACT

An electronic device. The electronic device comprises a host, a display, a fixed member, a first rotating member and a second rotating member. The fixed member is secured on the host and has a first positioning portion and a second positioning portion separated therefrom with a predetermined angle. The first rotating member is rotatably connected to the fixed member and has an engaging portion. The engaging portion moves between the first positioning portion and the second positioning portion along a curved route such that the first rotating member rotates relative to the fixed member with the predetermined angle. The second rotating member is fixed on the display and is connected to the first rotating member. The second rotating member rotates relative to the first rotating member.

18 Claims, 9 Drawing Sheets

ROTATING STRUCTURE AND ELECTRONIC DEVICE UTILIZING SAME

BACKGROUND OF THE INVENTION

1. Field of the Invention

The present invention relates to an electronic device, and in particular to an electronic device that provides a host and a display connected thereto rotatable by 360°.

2. Description of the Related Art

Taiwan Patent No. 496538 and 446135 and U.S. Pat. No. 5,845,366 respectively disclose a portable computer including a host and a display connected thereto rotatable by 360°.

A conventional rotating structure is employed to connect the host and display of the portable computer such that the host and display can rotate relative to one another. In addition to the rotating structure, a positioning device is selectively disposed in the portable computer to position the host and display during rotation.

SUMMARY OF THE INVENTION

An object of the invention is to provide an electronic device that provides a host and a display connected thereto rotatable by 360°. The electronic device has a reduced volume and advantages of simplified operation, positioning and wiring arrangement. The electronic device comprises a host, a display, a fixed member, a first rotating member and a second rotating member. The fixed member is fixed on the host and has a first positioning portion and a second positioning portion separated therefrom with a predetermined angle. The first rotating member is rotatably connected to the fixed member and has an engaging portion. The engaging portion moves between the first positioning portion and the second positioning portion along a curved route such that the first rotating member rotates relative to the fixed member with the predetermined angle. The second rotating member is fixed on the display and is connected to the first rotating member. The second rotating member rotates relative to the first rotating member.

Another object of the invention is to provide a rotating structure comprising a fixed member, a first rotating member and a second rotating member. The fixed member has a first positioning portion and a second positioning portion separated therefrom with a predetermined angle. The first rotating member is rotatably connected to the fixed member and has an engaging portion. The engaging portion moves between the first positioning portion and the second positioning portion along a curved route such that the first rotating member rotates relative to the fixed member with the predetermined angle. The second rotating member is connected to the first rotating member and rotates relative thereto.

The rotating structure further comprises a first rotating shaft disposed in the fixed member and first rotating member. The first rotating member rotates relative to the fixed member by means of the first rotating shaft.

The fixed member further comprises a first through hole and the first rotating member further comprises a second through hole opposite to the first through hole. The first rotating shaft is disposed in the first and second through holes.

The fixed member further comprises a curved surface. The first and second positioning portions are respectively connected to two opposite ends of the curved surface. The engaging portion moves between the first positioning portion and the second positioning portion and slides on the curved surface.

The first and second positioning portions comprise recessed grooves and the engaging portion comprises a pin.

The fixed member further comprises a first resilient holding element and a second resilient holding element respectively disposed in the first positioning portion and second positioning portion to hold the engaging portion.

The first and second resilient holding elements comprise C-type retaining rings and clipping springs.

The second rotating member further comprises a second rotating shaft and the first rotating member further comprises a third through hole. The second rotating shaft is disposed in the third through hole such that the second rotating member rotates relative to the first rotating member.

The rotating structure further comprises a torque-adjustable member and the first rotating member further comprises a through groove connected to the third through hole. The torque-adjustable member is disposed on the second rotating shaft of the second rotating member and in the third through hole and through groove.

The fixed member further comprises a first fixing portion to secure the fixed member on a first electronic device.

The first fixing portion further comprises at least one first fixing hole.

The second rotating member further comprises a second fixing portion to secure the second rotating member on a second electronic device. The first electronic device rotates relative to the second electronic device by means of the rotating structure.

The second fixing portion further comprises at least one second fixing hole.

The rotating structure further comprises a resilient rotating element disposed in the fixed member and first rotating member. The first rotating member rotates relative to the fixed member by means of the resilient rotating element.

The fixed member further comprises a first through hole and the first rotating member further comprises a second through hole. The resilient rotating element is disposed in the first and second through holes.

The fixed member further comprises a first engaging hole connected to the first through hole and the first rotating member further comprises a second engaging hole connected to the second through hole. The resilient rotating element is disposed in the first and second through holes and is engaged in the first and second engaging holes.

The resilient rotating element comprises a spring.

The fixed member further comprises a planar surface. The first and second positioning portions are formed on the planar surface. The engaging portion moves between the first positioning portion and the second positioning portion and slides on the planar surface along the curved route.

The first and second positioning portions are holes and the engaging portion comprises a pin.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1A:
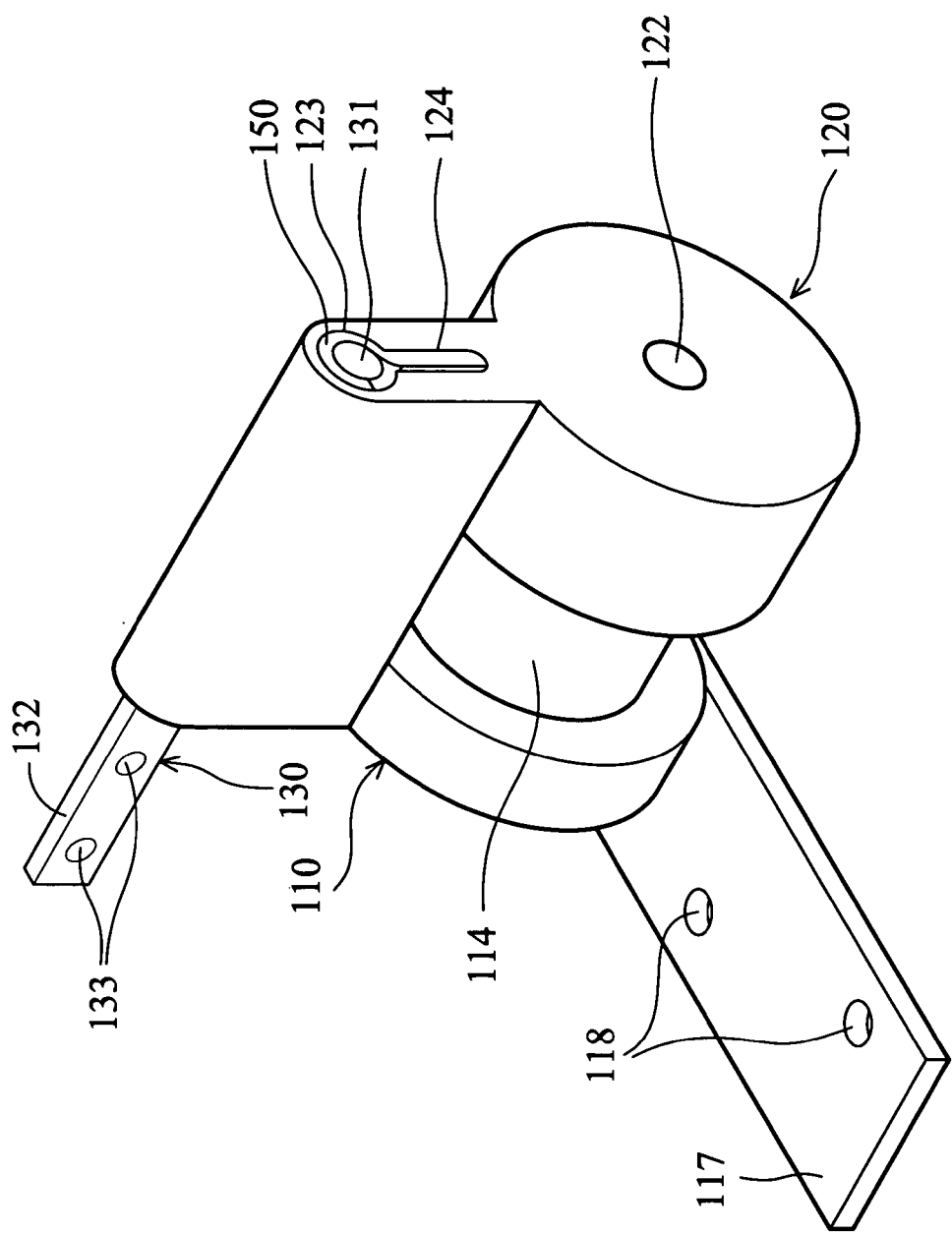
FIG. 1A is a perspective assembly view of the rotating structure of the first embodiment of the invention.
Figure 1B:
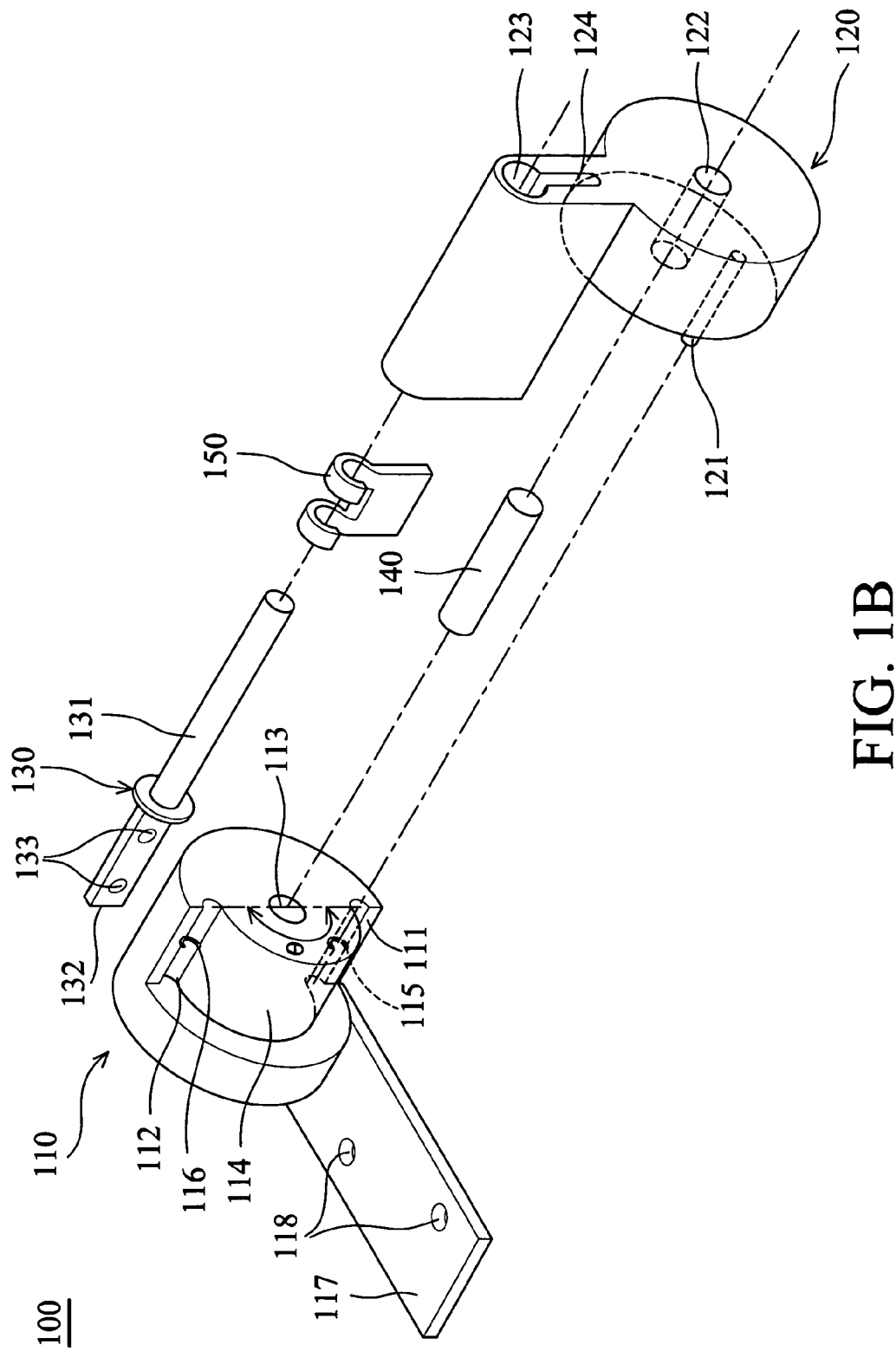
FIG. 1B is a perspective exploded view according to FIG. 1A.
Figure 2:
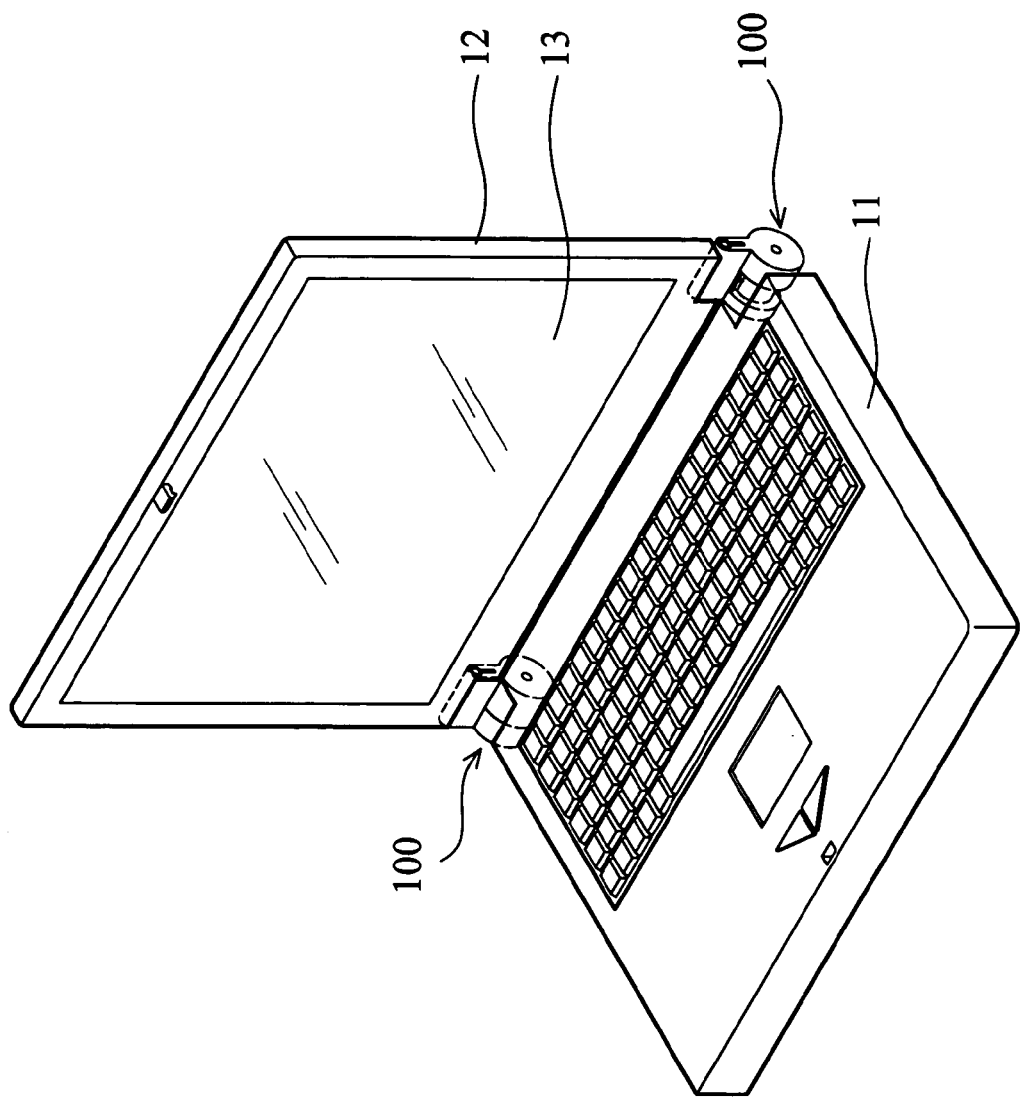
FIG. 2 is a schematic view showing application of the rotating structure of the first embodiment of the invention.

Referring to FIGS. 1A, 1B and 2, the rotating structure 100 of this embodiment can be employed in a portable computer (an electronic device) 10 having a host (first electronic device) 11 and a display (second electronic device) 12. The host 11 can rotate relative to the display 12 by 360° by means of the rotating structure 100.

As shown in FIG. 1A and FIG. 1B, the rotating structure 100 comprises a fixed member 110, a first rotating member 120, a second rotating member 130 and a first rotating shaft 140.

As shown in FIG. 1B, the fixed member 110 comprises a first positioning portion 111, a second positioning portion 112, a first through hole 113, a curved surface 114, a first resilient holding element 115, a second resilient holding element 116 and a first fixing portion 117. The first positioning portion 111 and second positioning portion 112 are respectively connected to two opposite ends of the curved surface 114. Accordingly, the first positioning portion 111 is separated from the second positioning portion 112 with a predetermined angle θ with respect to the first through hole 113. In this embodiment, the first positioning portion 111 and second positioning portion 112 are recessed grooves. The first resilient holding element 115 and second resilient holding element 116 are respectively disposed in the first positioning portion 111 and second positioning portion 112 to provide proper holding resilience. Additionally, the first resilient holding element 115 and second resilient holding element 116 can be C-type retaining rings or clipping springs. In this embodiment, the first resilient holding element 115 and second resilient holding element 116 are C-type retaining rings. Moreover, two first fixing holes 118 are formed on the first fixing portion 117.

As shown in FIG. 1B, the first rotating member 120 comprises an engaging portion 121, a second through hole 122, a third through hole 123 and a through groove 124. The second through hole 122 is opposite to the first through hole 113 of the fixed member 110. The first rotating shaft 140 is disposed in the first through hole 113 of the fixed member 110 and second through hole 122 of the first rotating member 120. The first rotating member 120 can rotate relative to the fixed member 110 by means of the first rotating shaft 140. In this embodiment, the engaging portion 121 is a pin. When the first rotating member 120 rotates relative to the fixed member 110, the engaging portion 121 thereof moves between the first positioning portion 111 and the second positioning portion 112 along a curved route. Specifically, the engaging portion 121 moves between the first positioning portion 111 and the second positioning portion 112 and slides on the curved surface 114 of the fixed member 110. Due to retardation provided by the first positioning portion 111 and the second positioning portion 112 of the fixed member 110, the first rotating member 120 is only able to rotate relative to the fixed member 110 with the predetermined angle θ. Additionally, since the first resilient holding element 115 and second resilient holding element 116 are respectively disposed in the first positioning portion 111 and second positioning portion 112, the engaging portion 121 is engaged in the first resilient holding element 115 or second resilient holding element 116 when moving to the first positioning portion 111 or second positioning portion 112. The engaging portion 121 can be accurately positioned in the first positioning portion 111 or second positioning portion 112 by the holding resilience provided by the first resilient holding element 115 or second resilient holding element 116. Thus, an accurate angle of rotation with which the first rotating member 120 rotates relative to the fixed member 110 can be obtained. Moreover, the through groove 124 is connected to the third through hole 123.

Figure 1C:
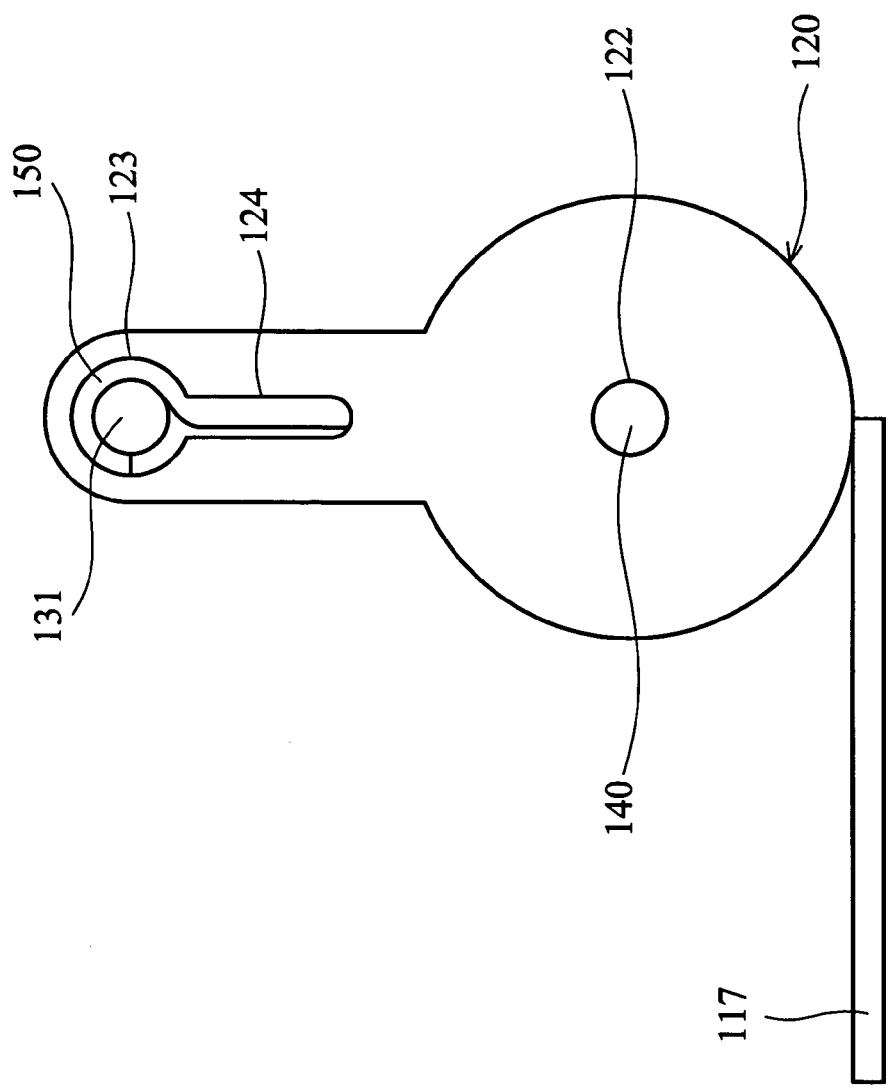
FIG. 1C is a side view according to FIG. 1A.

As shown in FIG. 1B, the second rotating member 130 comprises a second rotating shaft 131 and a second fixing portion 132. The rotating structure 100 further comprises a torque-adjustable member 150 disposed on the second rotating shaft 131 of the second rotating member 130. As shown in FIG. 1C, when the second rotating member 130 and the first rotating member 120 are assembled, the second rotating shaft 131 of the second rotating member 130 and the torque-adjustable member 150 are simultaneously disposed in the third through hole 123 and the through groove 124 of the first rotating member 120. The torque-adjustable member 150 is fixed in the first rotating member 120 due to construction of the third through hole 123 and the through groove 124. The second rotating shaft 131 of the second rotating member 130 can rotate in the third through hole 123 and on the torque-adjustable member 150. Specifically, the torque between the second rotating member 130 and the first rotating member 120 can be adjusted by means of the torque-adjustable member 150. In this embodiment, the torque between the second rotating member 130 and the first rotating member 120 is less than that between the first rotating member 120 and the fixed member 110. Additionally, two second fixing holes 133 are formed on the second fixing portion 132. The predetermined angle θ of this embodiment is 180°.

The following description is directed to applications of the rotating structure 100.

As shown in FIG. 1A and FIG. 2, the first fixing portion 117 of the rotating structure 100 is fixed on the host 11 of the portable computer 10 by two bolts (not shown) fitted in the first fixing holes 118 and host 11. In another aspect, the second fixing portion 132 of the rotating structure 100 is fixed on the display 12 by bolts (not shown) fitted in the second fixing holes 133 and display 12.

Figure 3A:
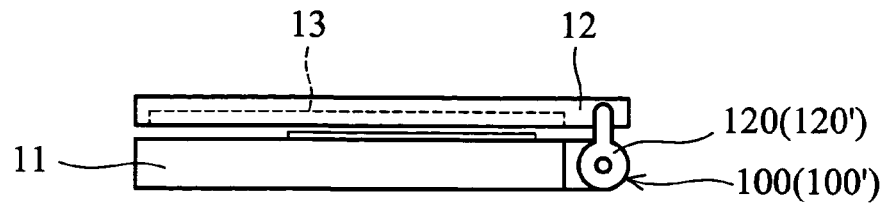
FIG. 3A shows a portable computer employing the rotating structure of the invention in a first application condition.
Figure 3B:
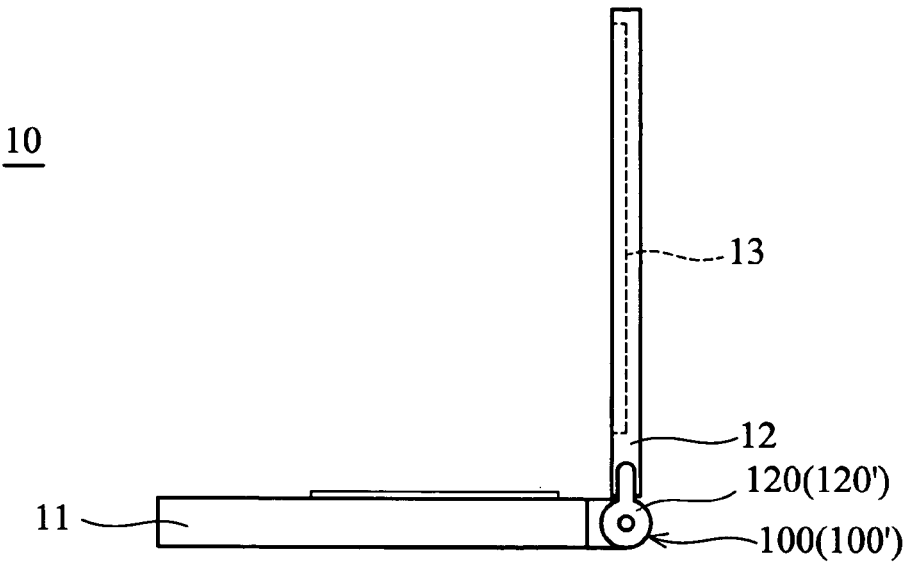
FIG. 3B shows a portable computer employing the s rotating structure of the invention in a second application condition.
Figure 3C:
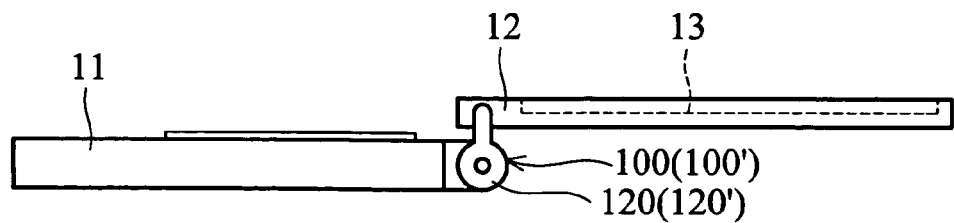
FIG. 3C shows a portable computer employing the rotating structure of the invention in a third application condition.

As shown in FIG. 3A and FIG. 1B, when the portable computer 10 is in a first application condition, the engaging portion 121 of the first rotating member 120 of the rotating structure 100 is positioned in the first positioning portion 111 of the fixed member 110 (or engaged in the first resilient holding element 115) and a monitor 13 of the display 12 faces the host 11. The display 12 can then be rotated to the position shown in FIG. 3B. At this point, please refer to FIG. 1B, the portable computer 10 is in a second application condition. Since the torque between the second rotating member 130 and the first rotating member 120 is less than that between the first rotating member 120 and the fixed member 110, the engaging portion 121 of the first rotating member 120 is still in the first positioning portion 111 of the fixed member 110. The display 12 and host 11 form an included angle of 90° therebetween by relative rotation between the second rotating member 130 and the first rotating member 120. The display 12 can further be rotated to the position as shown in FIG. 3C. At this point, the portable computer 10 is in a third application condition. Specifically, when the portable computer 10 changes from the first application condition to the third application condition, a user can access data via the monitor 13.

Figure 3D:
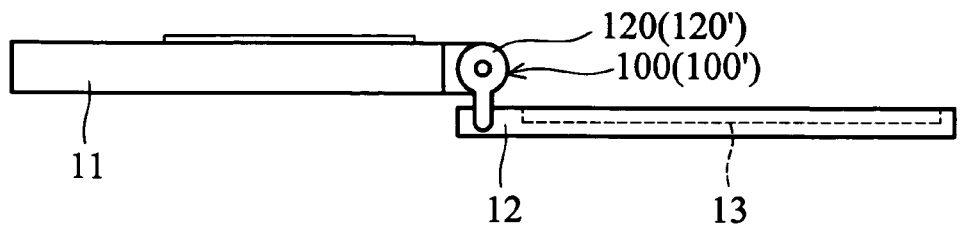
FIG. 3D shows a portable computer employing the rotating structure of the invention in a fourth application condition.
Figure 3E:
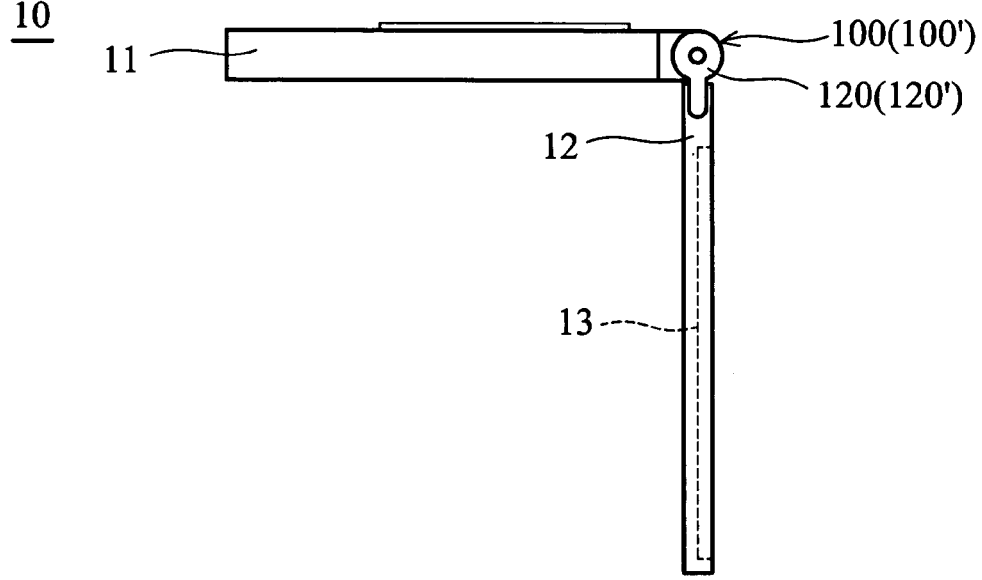
FIG. 3E shows a portable computer employing the rotating structure of the invention in a fifth application condition.
Figure 3F:
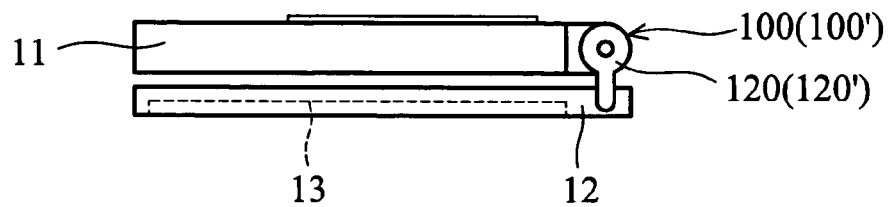
FIG. 3F shows a portable computer employing the rotating structure of the invention in a sixth application condition.

The portable computer 10 can also be changed from the first application condition to a fourth application condition as shown in FIG. 3D. The operation is that the first rotating member 120 is directly rotated such that the engaging portion 121 thereof moves into the second positioning portion 112 of the fixed member 110 (or is engaged in the second resilient holding element 116) along the curved surface 114. The display 12 can then be rotated to the position as shown in FIG. 3E. At this point, the portable computer 10 is in a fifth application condition and the display 12 and host 11 again form the included angle of 90° therebetween by relative rotation between the second rotating member 130 and the first rotating member 120. Specifically, when the portable computer 10 is in the fifth application condition, the ends of the host 11 and display 12 can simultaneously contact a planar surface (such as a tabletop) and the user can also access the data via the monitor 13 of the display 12. The display 12 can further be rotated to the position as shown in FIG. 3F. At this point, the portable computer 10 is in a sixth application condition and the monitor 13 of the display 12 faces opposite to the host 11. The portable computer 10 thereby serves as a tablet PC and data can be accessed via the monitor 13 of the display 12.

Second Embodiment

Elements corresponding to those in the first embodiment are given the same reference numerals, and explanation thereof is omitted for simplification of the description.

Figure 4A:
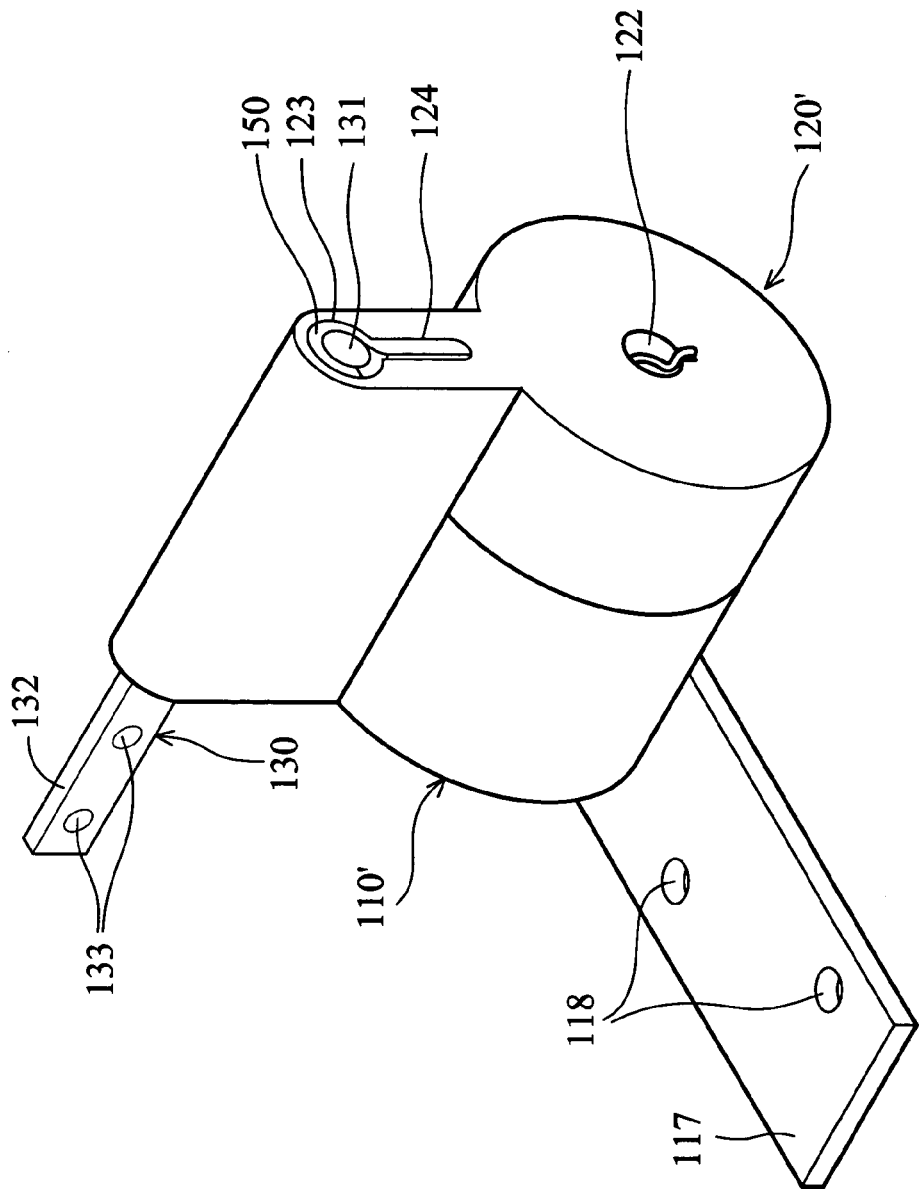
FIG. 4A is a perspective assembly view of the rotating structure of the second embodiment of the invention.
Figure 4B:
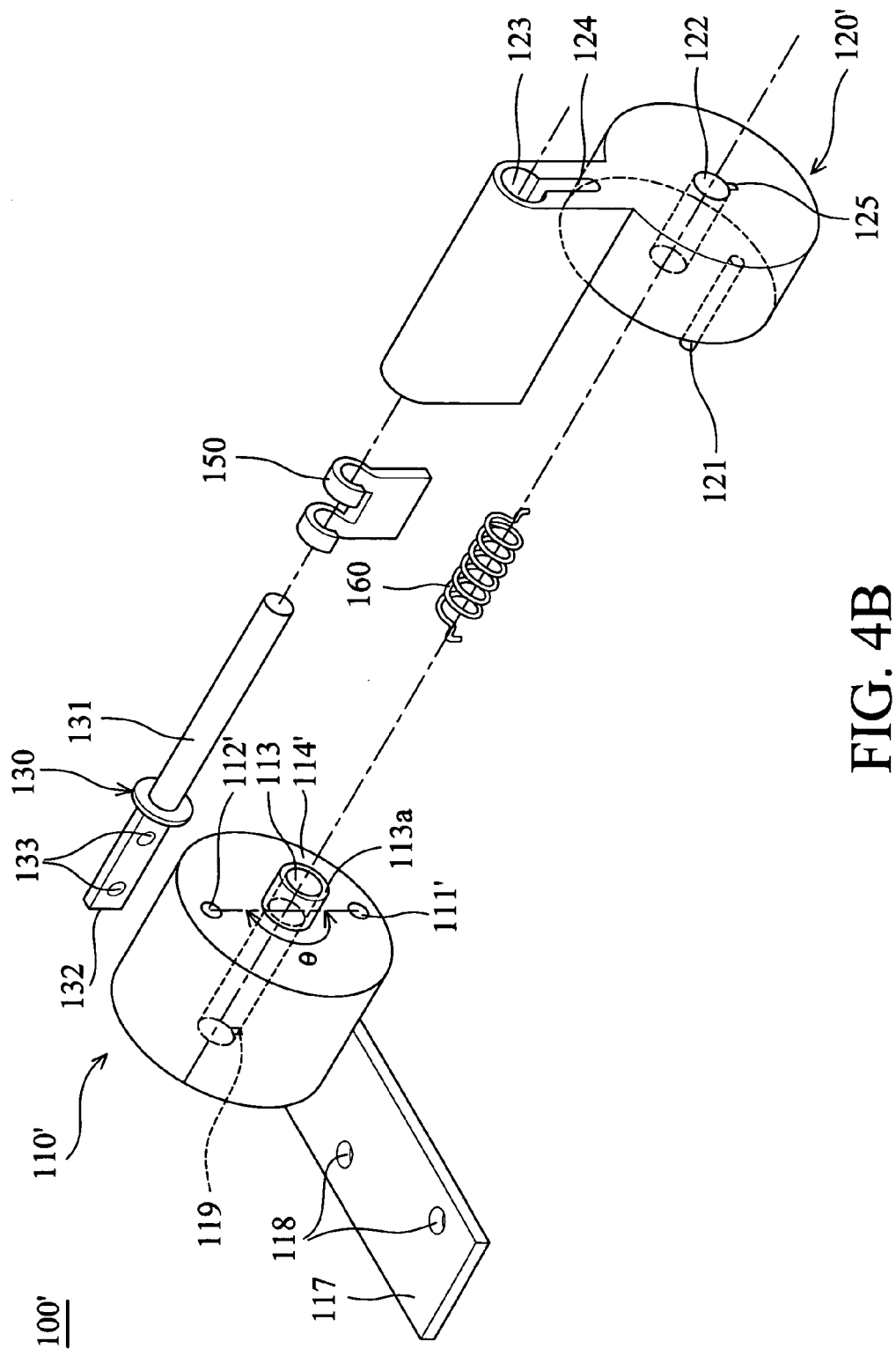
FIG. 4B is a perspective exploded view according to FIG. 4A.
Figure 5:
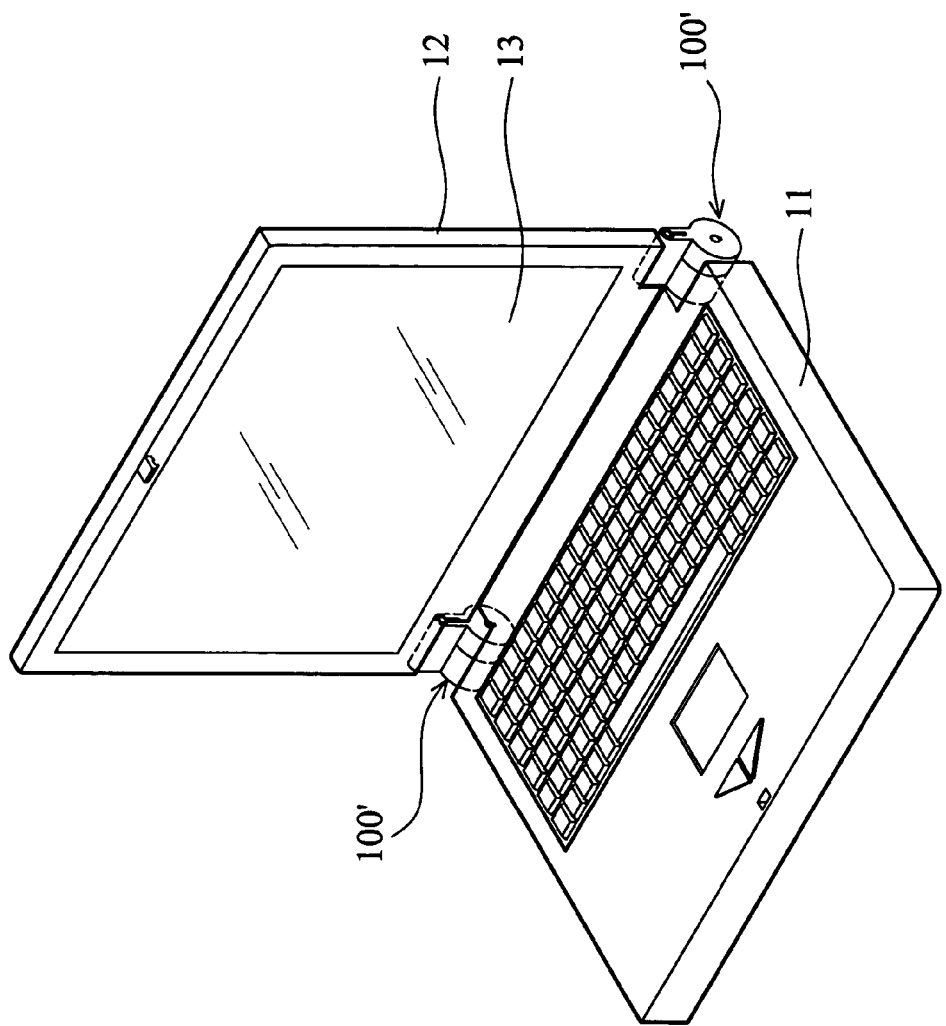
FIG. 5 is a schematic view showing application of the rotating structure of the second embodiment of the invention.

Referring to FIGS. 4A, 4B and 5, the rotating structure 100' of this embodiment can also be employed in the portable computer (electronic device) 10 having the host (first electronic device) 11 and display (second electronic device) 12. The host 11 can rotate relative to the display 12 by 360° by means of the rotating structure 100'.

As shown in FIG. 4A and FIG. 4B, the rotating structure 100' comprises a fixed member 110', a first rotating member 120', a second rotating member 130 and a resilient rotating element 160.

As shown in FIG. 4B, the fixed member 110' comprises a first positioning portion 111', a second positioning portion 112', a first through hole 113, a planar surface 114', a first engaging hole 119, a first fixing portion 117 and an annular protrusion 113a. The annular protrusion 113a protrudes from the planar surface 114' and surrounds the first through hole 113. The first positioning portion 111' and second positioning portion 112' are formed on the planar surface 114'. Accordingly, the first positioning portion 111' is separated from the second positioning portion 112' with a predetermined angle θ with respect to the first through hole 113. In this embodiment, the first positioning portion 111' and second positioning portion 112' are holes. Additionally, the first engaging hole 119 is connected to the first through hole 113 and two first fixing holes 118 are formed on the first fixing portion 117.

As shown in FIG. 4B, the first rotating member 120' comprises an engaging portion 121, a second through hole 122, a third through hole 123, a through groove 124, a second engaging hole 125 and an annular recessed groove (not shown). The second through hole 122 is opposite the first through hole 113 of the fixed member 110' and the second engaging hole 125 is connected to the second through hole 122. The annular recessed groove surrounds the second through hole 122 and corresponds to the annular protrusion 113a of the fixed member 110'. Namely, the annular protrusion 113a is in the annular recessed groove. The resilient rotating element 160 is disposed in the first through hole 113 and the second through hole 122 and two ends thereof are respectively engaged in the first engaging hole 119 of the fixed member 110' and second engaging hole 125 of the first rotating member 120'. In this embodiment, the engaging portion 121 is a pin and can be engaged in the first positioning portion 111' or second positioning portion 112' of the fixed member 110'. When the first rotating member 120' rotates relative to the fixed member 110', the first rotating member 120' is slightly separated from the fixed member 110' by pulling the resilient rotating element 160 such that the engaging portion 121 is disengaged from the first positioning portion 111' or the second positioning portion 112'. The engaging portion 121 then moves on the planar surface 114' of the fixed member 110' and between the first positioning portion 111' and the second positioning portion 112' along a curved route. Namely, when rotating and moving to be above the second positioning portion 112' or first positioning portion 111', the engaging portion 121 is immediately engaged therein by the resilience provided by the resilient rotating element 160. The rotation and positioning of the rotating structure 100' is thus achieved. Specifically, since the first positioning portion 111' is separated from the second positioning portion 112' with the predetermined angle θ, the first rotating member 120' can rotate relative to the fixed member 110' therewith. Moreover, the through groove 124 is connected to the third through hole 123.

In this embodiment, the resilient rotating element 160 is a spring.

Similarly, the rotating structure 100' further comprises a torque-adjustable member 150 disposed on the second rotating shaft 131 of the second rotating member 130 and the predetermined angle θ is 180°.

The following description is directed to application of the rotating structure 100'.

As shown in FIG. 4A and FIG. 5, two identical rotating structures 100' are disposed on the host 11 and display 12 of the portable computer 10. Each first fixing portion 117 and second fixing portion 132 of each rotating structure 100' are respectively fixed on the host 11 and the display 12 in the same manner as that of the first embodiment.

As shown in FIG. 3A and FIG. 4B, when the portable computer 10 is in the first application condition, the engaging portions 121 of the first rotating members 120' of the rotating structures 100' are positioned (engaged) in the first positioning portions 111' of the fixed members 110' and the monitor 13 of the display 12 faces the host 11. The display 12 can then be rotated to the position as shown in FIG. 3B. At this point, the portable computer 10 is in the second application condition. Specifically, as shown in FIG. 4B, since the engaging portion 121 of the first rotating member 120' is positioned in the first positioning portion 111' of the fixed member 110', the rotating member 120' does not rotate with the display 12 when the display 12 is rotated. The display 12 and host 11 can thus form an included angle of 90° therebetween by relative rotation between the second rotating member 130 and the first rotating member 120'. The display 12 can further be rotated to the position as shown in FIG. 3C. At this point, the portable computer 10 is in the third application condition. Similarly, when the portable computer 10 changes from the first application condition to the third application condition, the user can access data via the monitor 13 of the display 12.

The portable computer 10 can also change from the first application condition to the fourth application condition as shown in FIG. 3D, by slightly pulling the first rotating members 120' out of the fixed member 110' simultaneously such that the engaging portions 121 thereof are disengaged from the first positioning portions 111'. The first rotating members 120' are simultaneously rotated until the engaging portions 121 thereof rotate to be above the second positioning portions 112'. At this point, the engaging portions 121 are immediately engaged in the second positioning portions 112' by the resilient rotating element 160. The display 12 can then be rotated to the position as shown in FIG. 3E. At this point, the portable computer 10 is in the fifth application condition and the display 12 and host 11 again form the included angle of 90° therebetween by relative rotation between the second rotating member 130 and the first rotating member 120'. Similarly, when the portable computer 10 is in the fifth application condition, the ends of the host 11 and display 12 can simultaneously contact a planar surface (such as a tabletop) and data can be accessed via the monitor 13. The display 12 can further be rotated to the position as shown in FIG. 3F. At this point, the portable computer 10 is in the sixth application condition and the monitor 13 of the display 12 faces opposite to the host 11. The portable computer 10 thereby serves as a tablet PC and data can be accessed via the monitor 13 of the display 12.

In conclusion, the present rotating structure enables two electronic devices to relatively rotate by 360° and has a reduced volume. Further, the present rotating structure is easy to operate and can achieve the function of accurate positioning and simplified wiring arrangement.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotating structure, comprising:
    a fixed member, with a first positioning portion and a second positioning portion separated therefrom with a predetermined angle;
    a first rotating member rotatably connected to the fixed member and having an engaging portion, a through groove, and a third through hole, wherein the engaging portion moves between the first positioning portion and the second positioning portion along a curved route such that the first rotating member rotates relative to the fixed member with the predetermined angle, and the through groove is connected to the third through hole;
    a second rotating member connected to the first rotating member and rotating relative thereto, wherein the second rotating member comprises a second rotating shaft, and the second rotating shaft is disposed in the third through hole such that the second rotating member rotates relative to the first rotating member; and
    a torque-adjustable member disposed on the second rotating shaft of the second rotating member and in the third through hole and through groove of the first rotating member.

2. The rotating structure as claimed in claim 1, further comprising a first rotating shaft disposed in the fixed member and the first rotating member, wherein the first rotating member rotates relative to the fixed member by means of the first rotating shaft.

3. The rotating structure as claimed in claim 2, wherein the fixed member further comprises a first through hole, the first rotating member further comprises a second through hole opposite to the first through hole, and the first rotating shaft is disposed in the first and second through holes.

4. The rotating structure as claimed in claim 1, wherein the fixed member further comprises a curved surface, the first and second positioning portions are respectively connected to two opposite ends of the curved surface, and the engaging portion moves between the first positioning portion and the second positioning portion and slides on the curved surface.

5. The rotating structure as claimed in claim 4, wherein the first and second positioning portions comprise recessed grooves and the engaging portion comprises a pin.

6. The rotating structure as claimed in claim 5, wherein the fixed member further comprises a first resilient holding element and a second resilient holding element respectively disposed in the first positioning portion and the second positioning portion to hold the engaging portion.

7. The rotating structure as claimed in claim 6, wherein the first and second resilient holding elements comprise C-type retaining rings or clipping springs.

8. The rotating structure as claimed in claim 1, wherein the fixed member further comprises a first fixing portion to secure the fixed member on a first electronic device.

9. The rotating structure as claimed in claim 8, wherein the first fixing portion further comprises at least one first fixing hole.

10. The rotating structure as claimed in claim 8, wherein the second rotating member further comprises a second fixing portion to secure the second rotating member on a second electronic device, and the first electronic device rotates relative to the second electronic device by means of the rotating structure.

11. The rotating structure as claimed in claim 10, wherein the second fixing portion further comprises at least one second fixing hole.

12. The rotating structure as claimed in claim 1, further comprising a resilient rotating element disposed in the fixed member and first rotating member, wherein the first rotating member rotates relative to the fixed member by means of the resilient rotating element.

13. The rotating structure as claimed in claim 12, wherein the fixed member further comprises a first through hole, the first rotating member further comprises a second through hole, and the resilient rotating element is disposed in the first and second through holes.

14. The rotating structure as claimed in claim 13, wherein the fixed member further comprises a first engaging hole connected to the first through hole, the first rotating member further comprises a second engaging hole connected to the second through hole, and the resilient rotating element is disposed in the first and second through holes and is engaged in the first and second engaging holes.

15. The rotating structure as claimed in claim 12, wherein the resilient rotating element comprises a spring.

16. The rotating structure as claimed in claim 1, wherein the fixed member further comprises a planar surface, the first and second positioning portions are formed on the planar surface, and the engaging portion moves between the first positioning portion and the second positioning portion and slides on the planar surface along the curved route.

17. The rotating structure as claimed in claim 16, wherein the first and second positioning portions comprise holes and the engaging portion comprises a pin.

18. A rotating structure, comprising:
a fixed member comprising a first positioning portion, a second positioning portion, a curved surface, a first resilient holding element, and a second resilient holding element, wherein the first positioning portion is separated from the second positioning portion with a predetermined angle, the first and second positioning portions are respectively connected to two opposite ends of the curved surface, and the first and second resilient holding elements are respectively disposed in the first and second positioning portions;
a first rotating member rotatably connected to the fixed member and having an engaging portion, wherein the engaging portion moves between the first positioning portion and the second positioning portion along a curved route such that the first rotating member rotates relative to the fixed member with the predetermined angle, and the engaging portion is held by the first or second resilient holding element; and
a second rotating member connected to the first rotating member and rotating relative thereto.

* * * * *